United States Patent
Jang

(10) Patent No.: US 10,650,529 B2
(45) Date of Patent: May 12, 2020

(54) LANE DETECTION METHOD AND APPARATUS

(71) Applicant: Samsung Electronics Co., Ltd., Suwon-si (KR)

(72) Inventor: Cheolhun Jang, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 83 days.

(21) Appl. No.: 15/892,525

(22) Filed: Feb. 9, 2018

(65) Prior Publication Data
US 2019/0050993 A1 Feb. 14, 2019

(30) Foreign Application Priority Data
Aug. 9, 2017 (KR) .................. 10-2017-0100993

(51) Int. Cl.
*G06K 9/00* (2006.01)
*G06T 7/143* (2017.01)
(Continued)

(52) U.S. Cl.
CPC ............ *G06T 7/143* (2017.01); *B60W 30/12* (2013.01); *G05D 1/0246* (2013.01); *G06K 9/00798* (2013.01); *G06K 9/4628* (2013.01); *G06K 9/6271* (2013.01); *G06T 7/11* (2017.01); *G08G 1/167* (2013.01); *B60W 2552/00* (2020.02); *G05D 2201/0213* (2013.01); *G06T 2207/20016* (2013.01); *G06T 2207/20076* (2013.01); *G06T 2207/20084* (2013.01); *G06T 2207/30256* (2013.01)

(58) Field of Classification Search
CPC . G06T 2207/20016; G06T 2207/20076; G06T 2207/20084; G06T 2207/30256; G06T 7/143; G06T 7/11; G06K 9/6271; G06K 9/4628; G06K 9/00798; G05D 2201/0213; G05D 1/0246; B60W 2550/14; B60W 30/12; G08G 1/167
See application file for complete search history.

(56) References Cited

U.S. PATENT DOCUMENTS 8,441,535 B2   5/2013  Morin
9,081,385 B1 * 7/2015  Ferguson ........... G06K 9/00798
(Continued)

FOREIGN PATENT DOCUMENTS

KR   10-2012-0009590 A   2/2012
KR     10-1366871 B1    2/2014
(Continued)

OTHER PUBLICATIONS

Li et al (Deep Neural Network for Structural Prediction and Lane Detection in Traffic Scene, IEEE Transactions on neural networks and learning systems, vol. 28, No. 3, Mar. 2017, pp. 690-703). (Year: 2017).*

(Continued)

*Primary Examiner* — Amara Abdi
(74) *Attorney, Agent, or Firm* — Sughrue Mion, PLLC

(57) ABSTRACT

A lane detection method and apparatus is disclosed. The lane detection apparatus may set a regions of interest (ROIs) in a forward-view image of a vehicle obtained by a camera, estimate lane pixels corresponding to a lane from each of the ROIs using a neural network-based detector, and determine a lane region in the forward-view image based on the lane pixels.

20 Claims, 9 Drawing Sheets

(51) Int. Cl.
- *G06K 9/46* (2006.01)
- *G06K 9/62* (2006.01)
- *G06T 7/11* (2017.01)
- *B60W 30/12* (2020.01)
- *G05D 1/02* (2020.01)
- *G08G 1/16* (2006.01)

(56) References Cited

U.S. PATENT DOCUMENTS

| | | |
|---|---|---|
| 9,286,524 B1 | 3/2016 | Mei et al. |
| 9,633,273 B2 * | 4/2017 | Yoon .................... G06K 9/2081 |
| 2008/0199050 A1 * | 8/2008 | Koitabashi ................ B60R 1/00 382/107 |
| 2012/0316730 A1 | 12/2012 | Zhang et al. |
| 2013/0266175 A1 * | 10/2013 | Zhang ................. G06K 9/4638 382/103 |
| 2013/0321630 A1 | 12/2013 | Shin |
| 2016/0097853 A1 | 4/2016 | Kamo et al. |
| 2016/0167582 A1 | 6/2016 | Chen et al. |
| 2016/0223651 A1 | 8/2016 | Kamo et al. |
| 2016/0314359 A1 | 10/2016 | Sakamoto |
| 2016/0325753 A1 | 11/2016 | Stein et al. |
| 2018/0225527 A1 | 8/2018 | He et al. |

FOREIGN PATENT DOCUMENTS

| | | |
|---|---|---|
| KR | 10-1392850 B1 | 5/2014 |
| KR | 10-2014-0137100 A | 12/2014 |
| KR | 10-2016-0078865 A | 7/2016 |
| KR | 10-1677972 B1 | 11/2016 |
| WO | 2017/020528 A1 | 2/2017 |

OTHER PUBLICATIONS

Bailo et al (Robust Road Marking Detection and Recognition Using Density-Based Grouping and Machine Learning Techniques, 2017 IEEE, p. 760-768) (Year: 2017).*

Jun Li et al., "Deep Neural Network for Structural Prediction and Lane Detection in Traffic Scene", IEEE Transactions on Neural Networks and Learning Systems, vol. 28, No. 3, Mar. 2017, pp. 690-703, XP055352562. (14 pages total).

Oleksandr Bailo et al., "Robust Road Marking Detection and Recognition Using Density-Based Grouping and Machine Learning Techniques", 2017 IEEE Winter Conference on Applications of Computer Vision, Mar. 24, 2017, pp. 760-768, XP033096858. (9 pages total).

Communication dated Nov. 22, 2018 issued by the European Patent Office in counterpart European Patent Application No. 18167424.3.

\* cited by examiner

LANE DETECTION METHOD AND APPARATUS

CROSS-REFERENCE TO RELATED APPLICATIONS

This application claims the benefit under 35 USC § 119(a) of Korean Patent Application No. 10-2017-0100993 filed on Aug. 9, 2017, in the Korean Intellectual Property Office, the entire disclosure of which is incorporated herein by reference for all purposes.

BACKGROUND

1. Field

The following description relates to lane detection technology.

2. Description of Related Art

In automatic or autonomous driving, various driving operations may be automatically performed. For example, an autonomously driving host vehicle may travel on a road without a driver taking actions, such as turning a steering wheel, actuating an accelerator pedal, or a brake pedal. Various technologies for the autonomous driving use information collected from surrounding image that is obtained by a vehicle. Recognizing an accurate location of a road lane using such information may lead to safer autonomous driving.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a lane detection method including setting regions of interest (ROIs) in a forward-view image of a vehicle, estimating lane pixels corresponding to a lane from each ROI of the ROIs using a neural network-based detector, and determining a lane region in the forward-view image based on the estimating.

The estimating of the lane pixels may include changing an image resolution of at least one of the ROIs to a lower image resolution, and estimating lane pixels from the at least one of the ROIs with the lower image resolution.

The setting of the ROIs may include setting a basic ROI including a road region in the forward-view image, and an additional ROI including a portion of the road region in the forward-view image.

The additional ROI may include a remote road region located distal to the vehicle.

The setting of the ROIs may include estimating a location of a vanishing point of lanes based on previously determined lanes, and determining a location of the additional ROI based on the location of the vanishing point.

The determining of the lane region may include determining the lane region based on lane pixels estimated from the basic ROI and lane pixels estimated from the additional ROI.

The estimating of the lane pixels may include adjusting an image resolution of the basic ROI to correspond to an image resolution of the additional ROI, and estimating, using the detector, lane pixels from each of the additional ROI and the basic ROI with the adjusted image resolution.

The determining of the lane region may include determining lane pixels from the basic ROI with an original image resolution based on the lane pixels estimated from the basic ROI with the adjusted image resolution, and determining the lane region based on locations of the lane pixels determined from the basic ROI with the original image resolution and locations of the lane pixels determined from the additional ROI.

The setting of the ROIs may include setting a basic ROI including a road region in the forward-view image, and an additional ROI based on a road situation in front of the vehicle.

The setting of the ROIs may include detecting a presence or absence of at least one of an intersection, a divided road, a merging road, a tollgate entrance, or a tollgate access road in the forward-view image, and setting the additional ROI based on a result of the detecting.

The setting of the ROIs may include detecting a presence or absence of at least one of an intersection, a divided road, a merging road, a tollgate entrance, or a tollgate access road in front of the vehicle based on location information of the vehicle and road information in map information, and setting the additional ROI based on a result of the detecting.

The estimating of the lane pixels may include outputting probability information indicating a probability that each image pixel included in the each ROI corresponds to a lane.

The determining of the lane region may include merging the probability information determined for each of the ROIs, and determining the lane region in the forward-view image based on the merged probability information.

One or more of the ROIs may overlap one another.

The estimating of the lane pixels may include estimating, in parallel, the lane pixels from the ROIs.

The setting of the ROIs may include setting a basic ROI including a first portion of the forward-view image, and an additional ROI including a second portion of the forward-view image that may be distal from the vehicle.

The setting of the basic ROI may include setting the basic ROI based on a central point of the forward-view image.

In another general aspect, there is provided a lane detection apparatus including a camera configured to capture an image in front of a vehicle, and a processor configured to set regions of interest (ROIs) in the image of the vehicle, estimate lane pixels corresponding to a lane from each ROI of the ROIs using a neural network-based detector, and determine a lane region in the image based on the lane pixels.

The processor may be configured to set a basic ROI including a road region in the image, and an additional ROI including a portion of the road region in the image.

The additional ROI may be based on a road situation in front of the vehicle.

The processor may be configured to change an image resolution of one or more of the ROIs to a lower image resolution, and to estimate lane pixels from the one or more ROI with the lower image resolution.

The detector may be configured to output probability information indicating a probability of each image pixel in the each ROI corresponds to a lane, and the processor may be further configured to merge the probability information determined for each of the ROIs, and to determine the lane region in the image based on the merged probability information.

In another general aspect, there is provided a lane detection apparatus including a camera configured to capture an image in front of a vehicle, and a processor configured to set a basic ROI including a road region in the image, and at least one additional ROI including a portion of the road region, and adjust an image resolution of the basic ROI, a neural network-based detector configured to estimate lane pixels corresponding to a lane from the basic ROI with the adjusted image resolution and the at least one additional ROI, and the processor is further configured to determine a lane region in the image based on the lane pixels.

The image resolution of the basic ROI may be reduced to an image resolution of the at least one additional ROI, and the neural network-based detector may include a first neural network-based detector and a second neural network-based detector operating in parallel, wherein the first neural network-based detector may be configured to estimate lane pixels from the basic ROI, and the second neural network-based detector may be configured to estimate lane pixels from the at least one additional ROI.

Other features and aspects will be apparent from the following detailed description, the drawings, and the claims.

Figure 1:
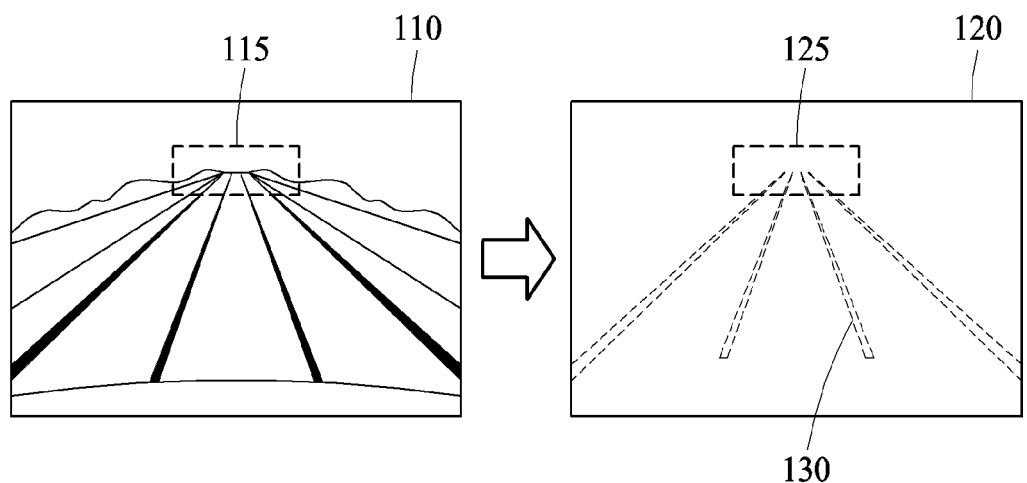
FIG. 1 is a diagram illustrating an example of a lane region detected in a forward-view image of a vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise. It will be further understood that the use of the term 'may' herein with respect to an example or embodiment, e.g., as to what an example or embodiment may include or implement, means that at least one example or embodiment exists where such a feature is included or implemented while all examples and embodiments are not limited thereto.

The embodiments described herein may be used for an automatic or autonomous driving system, an advanced driver assistance system (ADAS), cruise control, adaptive cruise control, lane keeping assist system, land departure warning system, or an augmented reality navigation system to detect a lane on a road. The embodiments may be applicable to different types of vehicles. The vehicle described herein refers to any mode of transportation, delivery, or communication such as, for example, for example, an automobile, a truck, a tractor, a scooter, a motorcycle, a cycle, an amphibious vehicle, a snowmobile, a boat, a public transit vehicle, a bus, a monorail, a train, a tram, an autonomous vehicle, a self-driving vehicle, an intelligent vehicle, an unmanned aerial vehicle, a drone, or a mobile device.

In another example, the lane detection apparatus disclosed herein is included in another device placed in the vehicle. In an example, the lane detection apparatus is embodied or incorporated in various types of products such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, a smart vehicle, an intelligent automobile, an autonomous driving vehicle, other consumer electronics/information technology (CE/IT) device, or any other device capable of wireless communication or network communication consistent with that disclosed herein.

In another example the lane detection apparatus is external to the vehicle, and is disposed in a device, such as, for example, a computer, a server, and a mobile phone, and communicates with the vehicle through wireless communication or network communication consistent with the disclosed herein.

A vehicle travel control in the autonomous driving system and the ADAS, and a guide route determination in the augmented reality navigation system may be performed based on a lane that is recognized through an image analysis, thus, recognizing an accurate lane relates directly to the safety of the occupants of the vehicle. In an example, such a lane recognition is performed based on a forward-view image obtained by capturing an image in front of a vehicle. In an example, the forward-view image is obtained by a camera provided in the vehicle. An example of the forward-view image is illustrated in FIG. 1.

FIG. 1 is a diagram illustrating an example of a forward-view image 110 obtained by capturing an image in front of a vehicle. The forward-view image 110 includes a scene of a road region in front of the vehicle. In an example, lanes in front of the vehicle are determined by detecting a lane pixel having a relatively high probability that the lane pixel corresponds to a lane in the forward-view image 110 through image processing, and fitting the detected lane pixel into a specific lane model. To detect the lane pixel from the forward-view image 110, a neural network-based detector may be used. The detector used herein refers to a model trained to detect lane pixels corresponding to a lane from an input image. The detector may be based on a neural network including a plurality of layers, and a training process of the detector may be performed based on training data, for example, forward-view images obtained in various situations.

Using such a neural network-based detector, lane pixels may be accurately detected from the forward-view image 110. Since information associated with an overall road situation indicated in the forward-view image 110 is input to the detector, the detector may detect the lane pixels robustly against various road situations. As illustrated, a result 120 of detecting lane pixels 130 is obtained by the detector. In an example, the detector outputs probability information indicating a probability that each image pixel included in the forward-view image 110 corresponds to a lane. In an example, the lane pixels 130 are detected based on a probability value in the probability information. For example, when image pixels having probability values determined by the detector are greater than a threshold value among image pixels of the forward-view image 110, the image pixels may be determined to be lane pixels.

As performance of cameras have improved, image resolution of a forward-view image has increased accordingly. As the image resolution of the forward-view image increases, the forward-view image includes a greater number of image pixels, and an overall processing speed based on the detector may be lowered when using the forward-view image. To improve processing speed, an image resolution, or a size, of a forward-view image may be reduced, and then lane pixels may be detected using the detector. Referring to FIG. 1, when an image resolution of the forward-view image 110 is reduced, the image resolution of a road region 115, which is remote from the image sensor of the forward-view image 110, may be reduced. Thus, lane pixels may not be accurately detected from a region 125 corresponding to the remote road region 115. Thus, although the image resolution of the forward-view image 110 is reduced to improve the processing speed, accurately and elaborately detecting a lane from the remote road region 115 may be needed for more accurate lane recognition.

A lane detection apparatus and method to be described hereinafter may enable an accurate detection of a lane from a remote road region, in addition to a close road region, although processing is performed by reducing an image resolution of a forward-view image. The lane detection apparatus recognizes a lane based on a forward-view image of a vehicle obtained by a sensor, such as a camera, provided in the vehicle, and estimates a next lane. The lane detection apparatus may set multiple regions of interest (ROIs) in the forward-view image, and detect lane pixels through a detector based on the set ROIs. For example, the lane detection apparatus may set an ROI indicating an overall road situation in the forward-view image and an ROI indicating a remote road region in the forward-view image, and then detect lane pixels from each of the ROIs. An ROI used herein refers to a local region, which is a target in the forward-view image for lane detection. The lane detection apparatus may merge results of detecting lane pixels from the ROIs, and determine a final result of detecting the lane pixels. The lane detection apparatus may increase a processing speed by reducing an image resolution of the ROI indicating the overall road situation and maintaining an original image resolution of the remote road region. Thus, the lane detection apparatus more accurately detects lane pixels included in the remote road region.

Figure 2:
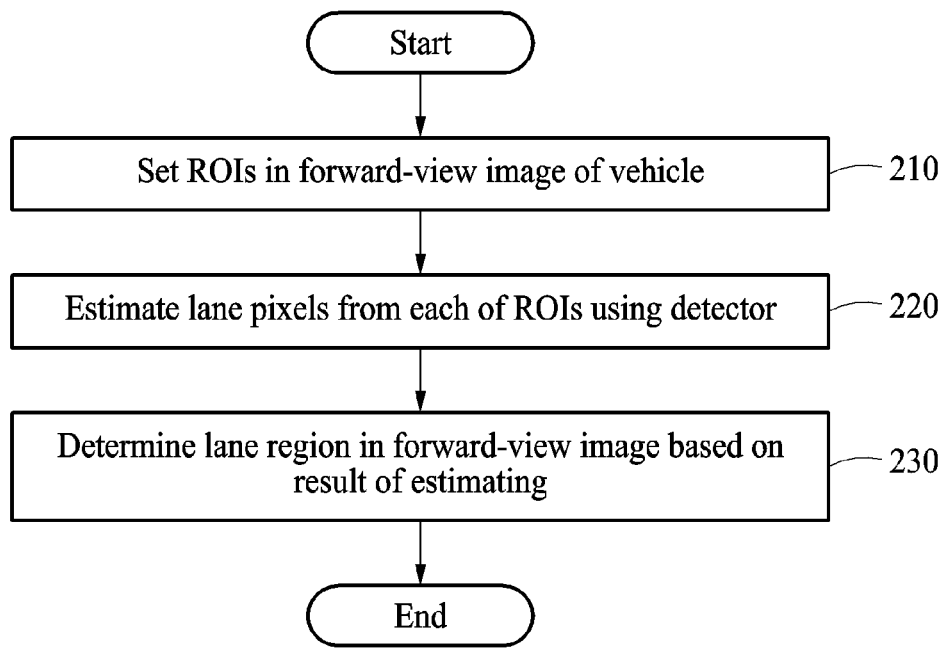
FIG. 2 is a diagram illustrating an example of a lane detection method.

FIG. 2 is a diagram illustrating an example of a lane detection method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, a lane detection apparatus sets a plurality of ROIs in a forward-view image of a vehicle. The ROIs may overlap one another. An image sensor, such as a camera provided in the vehicle may capture an image in front of the vehicle to obtain the forward-view image while the vehicle is travelling. The forward-view image used herein may be a color image. However, other types of forward-view image, such as, for example, a grayscale image and an infrared image, may be used without departing from the spirit and scope of the illustrative examples described. In an example, the lane detection apparatus sets ROIs for which lanes need to be detected from the forward-view image obtained by the camera.

In an example, the lane detection apparatus sets a basic ROI including a road region located at a shorter distance from the vehicle and a road region located a longer distance from the vehicle. In another example, the lane detection apparatus sets a basic ROI including an entire road region, and sets an additional ROI including the remote road region, which is a region on a road located at a longer distance from the vehicle. In an example, an entire region of the forward-view image or a region in a range preset based on a central point of the forward-view image may be set to be the basic ROI. In addition, for the additional ROI, a location of a vanishing point may be estimated based on previously determined lanes, and a location of the additional ROI may be determined based on the estimated location of the vanishing point. In an example, a size of the additional ROI may vary depending on the number of lanes in the forward-view image and a width of each lane. In an example, when the number of the lanes increases or the width of each lane increases, the size of the additional ROI may also increase. The additional ROI used herein refers to a region that is set to more accurately detect a remote lane located a longer distance from the vehicle. The number of ROIs to be set in the forward-view image is not restricted, and in another example, three ROIs may be set in the forward-view image. For example, in addition to the basic ROI and the additional ROI, an ROI including a road region located at a long distance or a middle distance from the vehicle may be set.

In another example, the lane detection apparatus sets a basic ROI including an entire road region in the forward-view image and an additional ROI based on a road situation in front of the vehicle. The lane detection apparatus sets the additional ROI based on a specific road situation indicated in the forward-view image. For example, the lane detection apparatus may detect a presence or absence of a changing road pattern, such as, for example, an intersection, a divided road, a merging road, a tollgate entrance, or a tollgate access road in the forward-view image, and set the additional ROI based on detecting the change in the road pattern. In another example, the lane detection apparatus may detect a presence or absence of a changing road pattern in front of the vehicle based on location information of the vehicle and road information in map information, and set the additional ROI based on a result of the detecting. In an example, the additional ROI is a region from which a lane needs to be accurately detected to determine a future traveling direction of the vehicle, track other vehicles, or prepare for a situation in which a lane changes rapidly. The specific road situation may be recognized by, for example, a neural network-based recognizer that is trained to recognize such a road situation from an input image.

According to an example, an additional ROI including a remote road region and an additional ROI indicating a specific road situation in the forward-view image may be set together. All regions from which lanes need to be accurately detected may be a target to be set as an additional ROI.

In operation 220, the lane detection apparatus estimates lane pixels corresponding to a lane from each of the ROIs using a neural network-based detector. The detector may detect lane pixels from an input ROI based on pixel value information of the ROI. The detector may output probability information indicating a probability that each image pixel included in the ROI corresponds to a lane pixel. For example, the detector may allocate a probability value of 0 to an image pixel that is not determined to be a lane in an ROI, and a probability value of 1 to an image pixel that is determined to be a lane in an ROI. In addition, the detector may allocate a probability value in a range of values greater than 0 and less than 1 to an image pixel that is not determined to be a lane but estimated to be a lane. The detector may allocate a probability value based on such estimation.

In an example, the lane detection apparatus changes an image resolution of at least one of the ROIs to be an image resolution lower than an original image resolution, and estimates lane pixels from the at least one of the ROIs with the lower image resolution. In an example, the lane detection apparatus may change an image resolution of the basic ROI including the entire road region to a lower image resolution, and estimate lane pixels from the basic ROI with the lower image resolution. For the additional ROI that needs more accurate lane detection, the lane detection apparatus estimates lane pixels from the additional ROI without a change in an image resolution. The basic ROI includes the entire road region, and thus the image resolution of the basic ROI may be generally higher than that of the additional ROI including a local road region. For example, the lane detection apparatus may decrease the image resolution of the basic ROI to the image resolution of the additional ROI, and estimate lane pixels. Through such an operation, more rapid detection of lane pixels may be enabled for the entire road region, and more detailed and accurate detection of lane pixels may be enabled for the local road region for which accurate lane detection is needed. A more detailed description will ensue with reference to FIG. 3.

In operation 230, the lane detection apparatus determines a lane region in the forward-view image based on estimating the lane pixels in operation 220. In an example, the lane region corresponds to a set of lane pixels. The lane detection apparatus merges the probability information, for example, information indicating a probability of an image pixel corresponding to a lane pixel, of each of the ROIs including the basic ROI and the additional ROI that are determined by the detector, and determines the lane region in the forward-view image based on the merged probability information. The merging of the probability information includes updating the probability information by merging the probability information of the additional ROI with the probability information of the basic ROI that is estimated by the detector. The lane detection apparatus determines image pixels having probability values greater than a threshold value to be lane pixels based on a result of merging the probability information, and determines the lane region in the forward-view image based on the determined lane pixels. Through such an operation, a lane may be rapidly and accurately detected from a forward-view image, and a remote lane located a long distance from a vehicle may also be accurately detected in addition to a close lane located a short distance from the vehicle. In an example, fitting a lane in front of the vehicle may be performed based on the determined lane region, and then autonomous driving of the vehicle may be controlled based on a result of the lane fitting.

Figure 3:
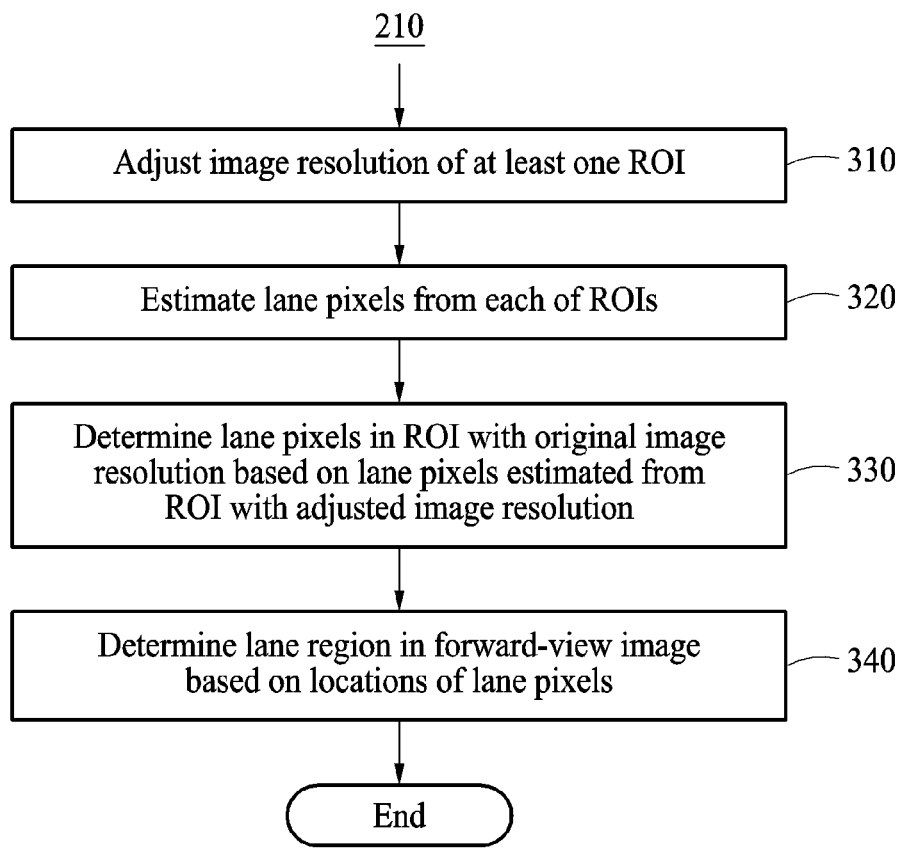
FIG. 3 is a diagram illustrating an example of a method of estimating lane pixels and determining a lane region.

FIG. 3 is a diagram illustrating an example of a method of estimating lane pixels and determining a lane region. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a lane detection apparatus adjusts an image resolution of at least one ROI among a plurality of ROIs set in operation 210 of FIG. 2. For convenience of description, it is assumed that a basic ROI including a road region located a shorter distance from a vehicle and a remote road region located a longer distance from the vehicle, and an additional ROI having an image resolution less than that of the basic ROI are set in a forward-view image of the vehicle. The basic ROI indicates an entire road region, and the additional ROI indicates the remote road region for which accurate lane detection is needed. In an example, the additional ROI is a portion of the basic ROI. The lane detection apparatus decreases a relatively higher image resolution of the basic ROI to the image resolution of the additional ROI. By decreasing the image resolution, a processing time may also be reduced.

In operation 320, the lane detection apparatus estimates lane pixels from each of the ROIs using a neural network-based detector. In an example, a plurality of detectors are used to extract, in parallel, the lane pixels from each of the ROIs. The detectors may be individual detectors that are distinguishable from one other. In another example, a unified detector of a neural network structure may be used. In the detector, image information, for example, a pixel value, of each of the ROIs may be input to different input layers, a middle layer may be shared, and results of estimating lane pixels of the ROIs may be output through different output layers. In another example, the ROIs may be input in a sequential order to a single detector, and lane pixels may be estimated for the ROIs in the sequential order. The lane detection apparatus estimates lane pixels from the basic ROI with the image resolution adjusted by the detector, hereinafter referred to as a low-resolution basic ROI, and lane pixels from the additional ROI. The detector outputs probability information indicating a probability that each image pixel included in the low-resolution basic ROI and the additional ROI corresponds to a lane.

In operation 330, the lane detection apparatus determines lane pixels from the basic ROI with an original image resolution based on the lane pixels estimated from the low-resolution basic ROI. The lane detection apparatus estimates probability information associated with lane pixels in the basic ROI with the original image resolution based on the probability information associated with the lane pixels in the low-resolution basic ROI, and determine the lane pixels based on the probability information associated with the basic ROI with the original image resolution. In an example, an image processing method such as interpolation may be used to restore the low-resolution basic ROI to the basic ROI with the original image resolution.

In operation 340, the lane detection apparatus determines lane pixels from the additional ROI based on a result of the estimating in operation 320, and determines a lane region in the forward-view image based on a location of the lane pixels determined from the basic ROI with the original image resolution and on a location of the lane pixels determined from the additional ROI.

Figure 4:
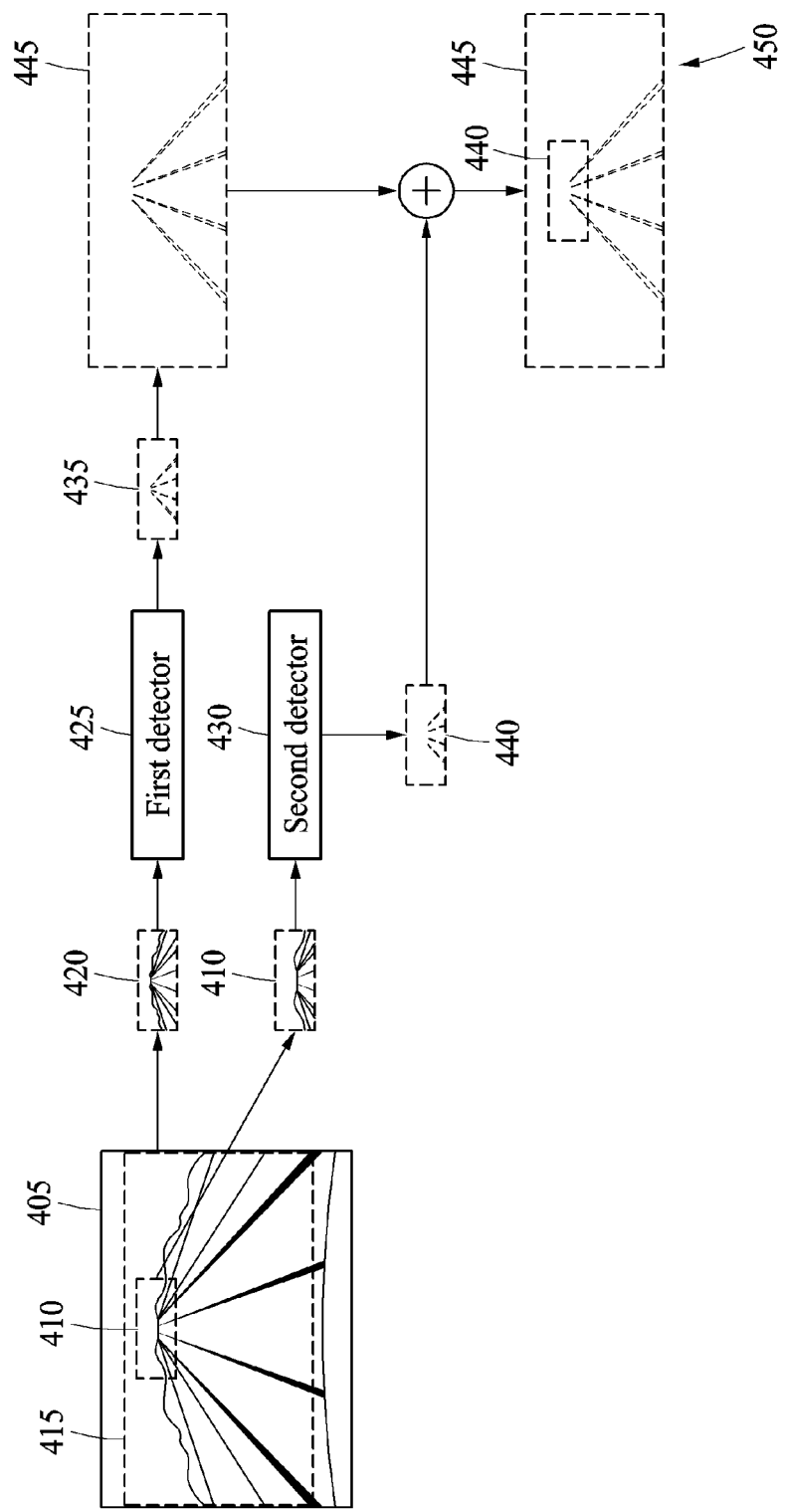
FIG. 4 is a diagram illustrating an example of a method of determining a lane region based on a plurality of regions of interest (ROIs).

FIG. 4 is a diagram illustrating an example of a method of determining a lane region based on a plurality of ROIs.

Referring to FIG. 4, a forward-view image 405 represents a view from in front of a vehicle that is obtained by a camera, which is provided in the vehicle. A lane detection apparatus sets a plurality of ROIs in the forward-view image 405 including, for example, a basic ROI 415 indicating an entire road region and an additional ROI 410 including a remote road region. The additional ROI 410 refers to a region for which accurate land detection is needed. The lane detection apparatus decreases an image resolution of the basic ROI 415 for rapid processing. In an example, the additional ROI 410 is extracted by performing image processing, for example, by cropping the additional ROI 410 from the forward-view image 405, and the basic ROI 415 with a low resolution may be extracted through image processing, for example, cropping and downsampling. For example, in a case in which an image resolution of the forward-view image 405 is 1920×1200 and an image resolution of the additional ROI 410 is 768×480, an image resolution of the basic ROI 415 is adjusted to 768×480, and thus a low-resolution basic ROI 420 is obtained.

Pixel value information of the low-resolution basic ROI 420 is input to a first detector 425, and pixel value information of the additional ROI 410 is input to a second detector 430. The first detector 425 estimates lane pixels from the low-resolution basic ROI 420, and the second detector 430 estimates lane pixels from the additional ROI 410. Such estimating of the lane pixels may be performed in parallel by the first detector 425 and the second detector 430.

The lane detection apparatus restores a result 435 of lane estimation from the low-resolution basic ROI 420 output from the first detector 425 to an original image resolution corresponding to the image resolution of the basic ROI 415. The lane detection apparatus merges a result 445 of lane estimation from the basic ROI with the restored original image resolution and a result 440 of lane estimation from the additional ROI 410, which is output from the second detector 430, to obtain a final estimation result 450. The lane detection apparatus determines a lane region in the forward-view image 405 based on locations of lane pixels in the final estimation result 450. Thus, a processing time is reduced and a lane is detected more accurately from a remote road region, and thus lane fitting may be enabled for a lane located far away from the vehicle.

Although decreasing the image resolution of the basic ROI 415 to be the same as the image resolution of the additional ROI 410 is described as an illustrative example, examples are not limited thereto, and thus the image resolution of the basic ROI 415 may be adjusted to be different from the image resolution of the additional ROI 410. In another example, the image resolution of the additional ROI 410, in addition to the image resolution of the basic ROI 415, may be adjusted to a lower image resolution.

Figure 5:
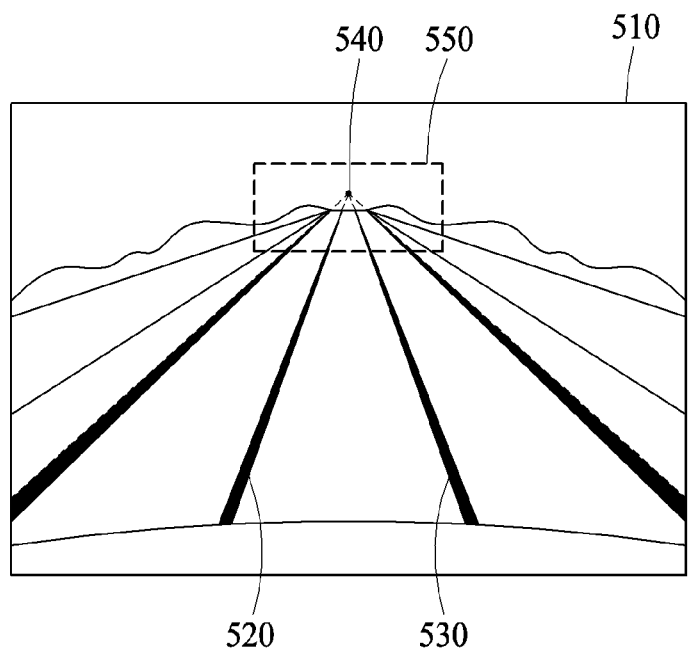
FIG. 5 is a diagram illustrating an example of a method of setting an additional ROI.

FIG. 5 is a diagram illustrating an example of a method of setting an additional ROI.

Referring to FIG. 5, a lane detection apparatus estimates a location of a vanishing point 540 based on lanes 520 and 530 that are previously determined, and sets a region in a range centered on the estimated location of the vanishing point 540 to be an additional ROI 550. Based on a result of lane fitting performed based on a previous forward-view image, the location of the vanishing point 540 in a current forward-view image 510 is estimated. A width of the additional ROI 550 may increase in response to the number of lanes in the forward-view image 510 increasing or a width of each lane in the forward-view image 510 increasing. Through such an operation, an additional ROI including a remote road region, for example, the additional ROI 550 as illustrated, may be set.

An additional ROI for which accurate lane detection is needed may be set differently based on a road situation in front of a vehicle, in addition to the remote road region described above with reference to FIG. 5. FIGS. 6A through 6D are diagrams illustrating examples of a method of setting an additional ROI in various road situations.

Figure 6A:
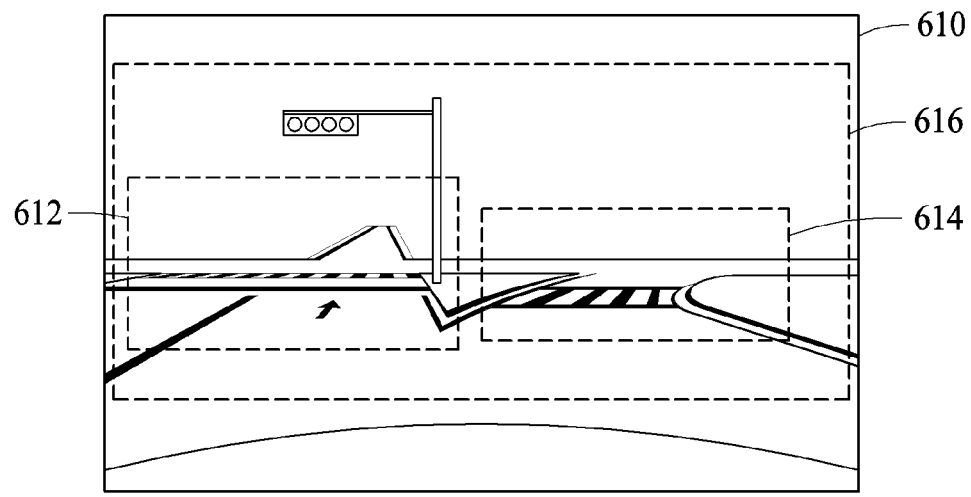
FIGS. 6A through 6D are diagrams illustrating other examples of a method of setting an additional ROI.
Figure 6B:
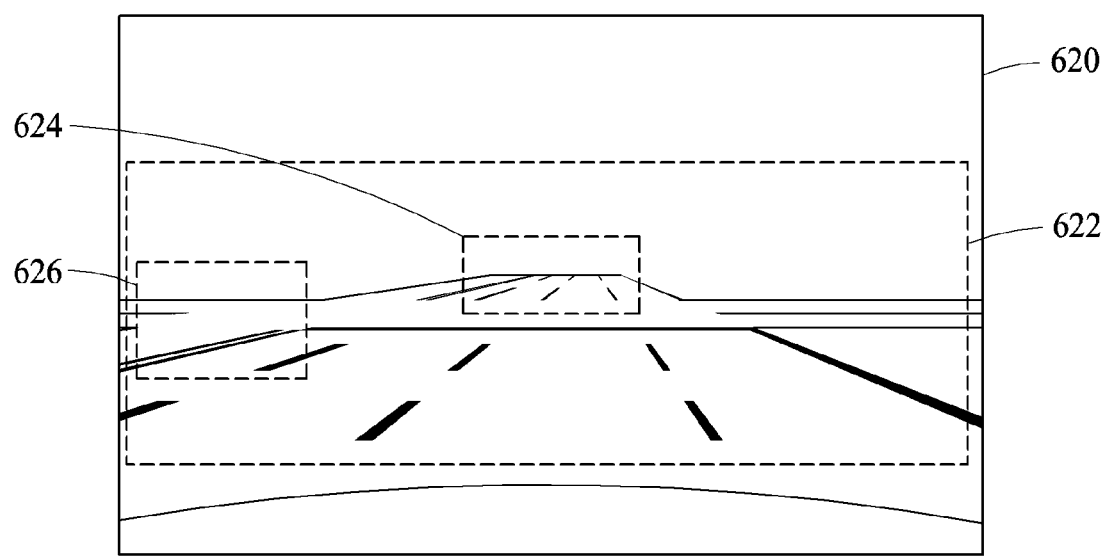
Figure 6C:
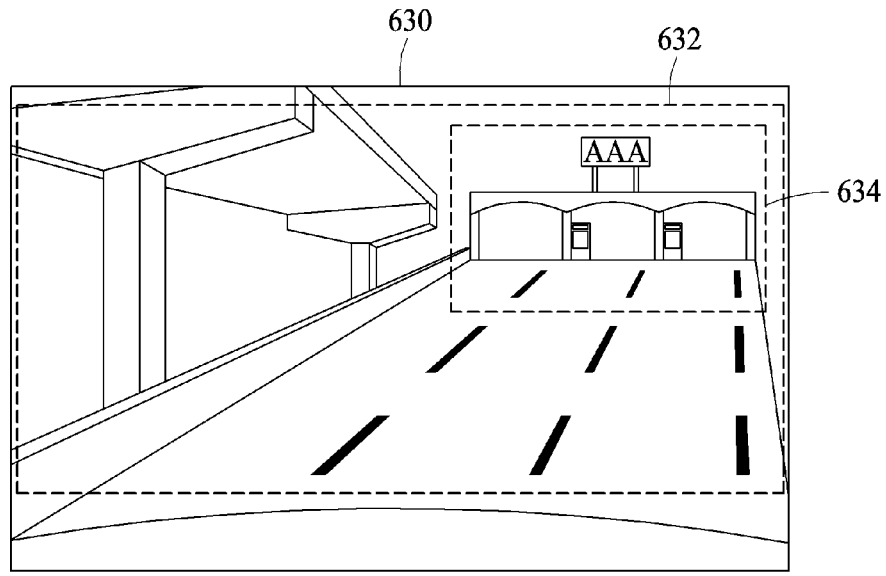
Figure 6D:
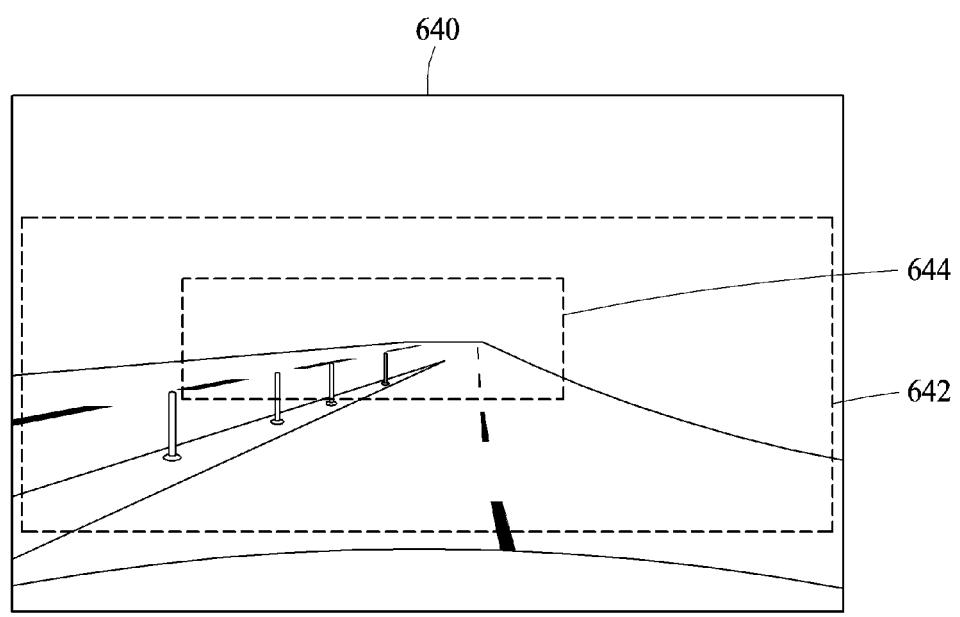

Referring to FIG. 6A, in a forward-view image 610, additional ROIs 612 and 614 including road regions on a divided road in a divided road situation are set along with a basic ROI 616 including an entire road region. Referring to FIG. 6B, in a forward-view image 620, additional ROIs 624 and 626 including road regions at an intersection in an intersection situation are set along with a basic ROI 622. Referring to FIG. 6C, in a forward-view image 630, an additional ROI 634 including a road region around a tollgate is set along with a basic ROI 632. Referring to FIG. 6D, in a forward-view image 640, an additional ROI 644 including a road region on a merging road in a merging road situation is set along with a basic ROI 642. The set additional regions illustrated in FIGS. 6A through 6D are ROIs for which lanes need to be accurately detected in various road situations. Locations of the additional ROIs may be based on results of detecting the divided road, the intersection, the tollgate, and the merging road in the respective forward-view images. In other examples, the locations may be determined based on location information of a vehicle and road information in map information.

Figure 7:
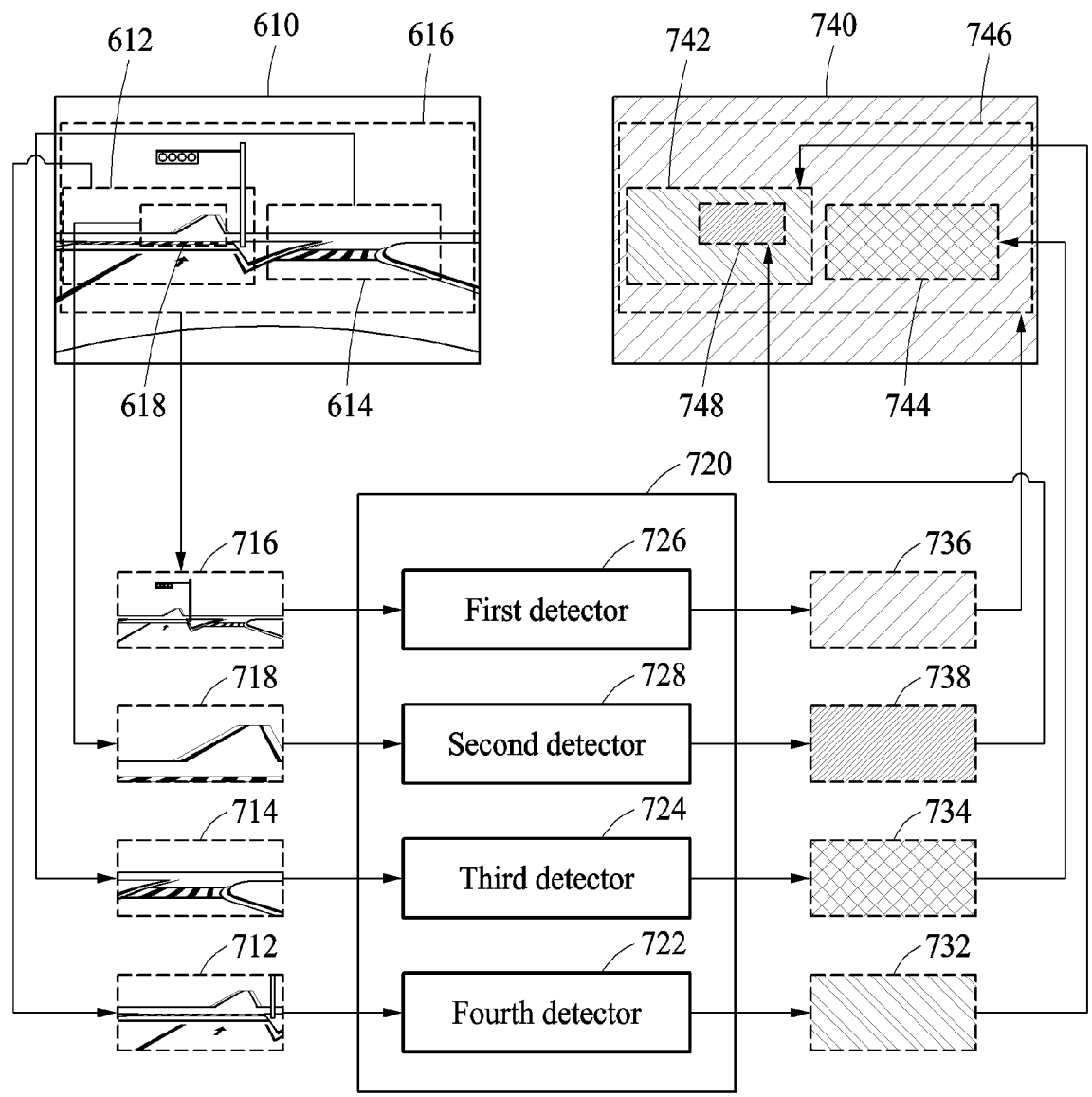
FIG. 7 is a diagram illustrating an example of a method of determining a lane region based on a plurality of ROIs.

FIG. 7 is a diagram illustrating an example of a method of determining a lane region based on a plurality of ROIs.

Referring to FIG. 7, in a forward-view image 610, additional ROIs 612, 614, and 618 for which accurate lane detection is needed are set along with a basic ROI 616. A lane detection apparatus extracts the basic ROI 616 and each of the additional ROIs 612, 614, and 618 from the forward-view image 610, and adjusts an image resolution of at least one of the basic ROI 616 and the additional ROIs 612, 614, and 618. For example, the lane detection apparatus may adjust image resolutions of the basic ROI 616 and the additional ROIs 612, 614, and 618 to be the same as one another. In such an example, the image resolutions of the basic ROI 616 and the additional ROIs 612 and 614 may be decreased to the image resolution of the additional ROI 618, which is a lowest image resolution among the image resolutions.

Pixel value information of each of a basic ROI 716 and additional ROIs 718, 714, and 712, which are obtained through the adjusting of the image resolutions, is input to a first detector 726, a second detector 728, a third detector 724, and a fourth detector 722, respectively. In an example, the first detector 726, the second detector 728, the third detector 724, and the fourth detector 722 are a unified single detector 720. Through the first detector 726, the second detector 728, the third detector 724, and the fourth detector 722, lane pixels may be estimated, in parallel, from the basic ROI 716 and the additional ROIs 718, 714, and 712. The result of estimating the lane pixels 736, 738, 734, and 732 that are output through the first detector 726, the second detector 728, the third detector 724, and the fourth detector 722, respectively, are restored to have respective original image resolutions of the basic ROI 616 and the additional ROIs 618, 614, and 612. Respective results 746, 748, 744, and 742 obtained through the restoring are merged into a final lane detection result image 740.

Figure 8:
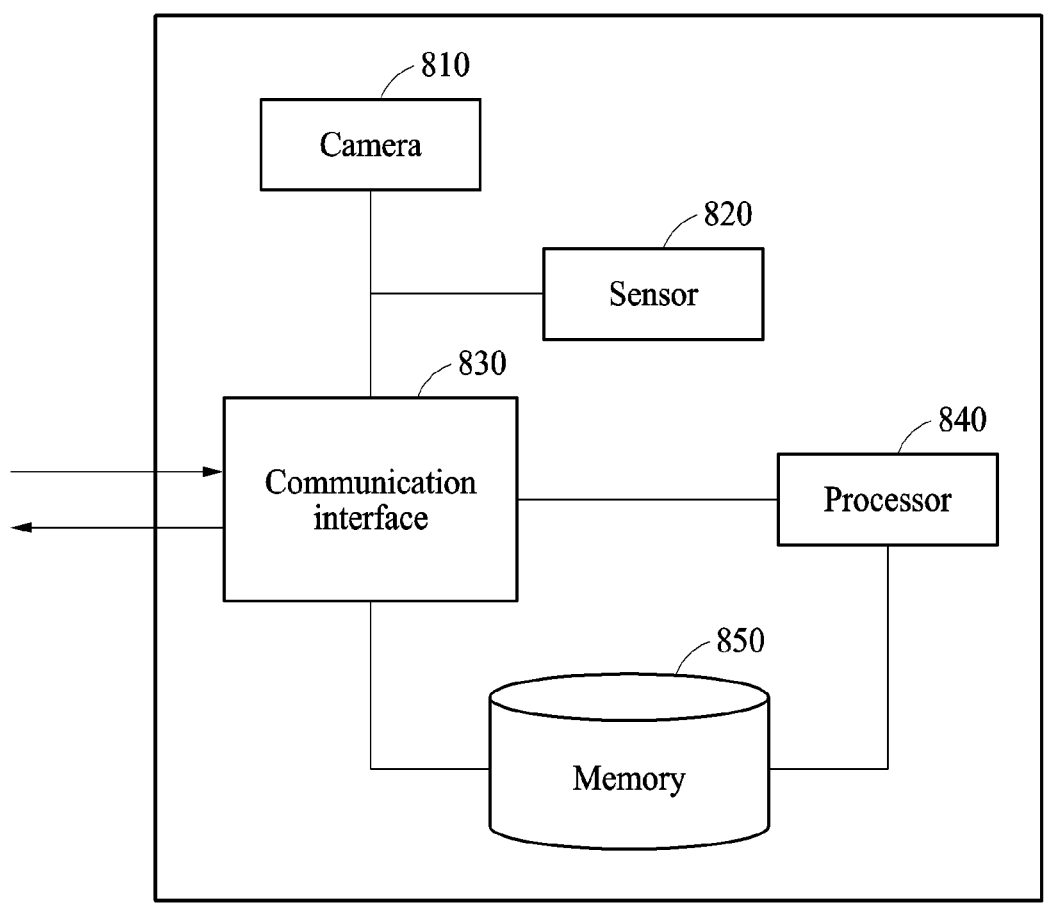
FIG. 8 is a diagram illustrating an example of a lane detection apparatus.

FIG. 8 is a diagram illustrating an example of a lane detection apparatus.

Referring to FIG. 8, a lane detection apparatus 800 recognizes a lane in a forward-view image obtained by capturing an image in front of a vehicle. The lane detection apparatus 800 detects the lane in the forward-view image based on a plurality of ROIs. The lane detection apparatus 800 may correspond to the lane detection apparatus described above, and be included in the vehicle. In an example, the lane detection apparatus 800 may be included in an autonomous vehicle that travels in an autonomous mode based on a recognized traveling environment in which the autonomous vehicle is currently traveling. The autonomous vehicle may recognize the traveling environment, and determine an autonomous driving route that is suitable for the traveling environment. The autonomous vehicle may control internal and external elements of the autonomous vehicle to travel along the determined autonomous driving route. Information associated with the lane detected by the lane detection apparatus 800 may be used to control a travel of the autonomous vehicle through lane fitting.

As illustrated in FIG. 8, the lane detection apparatus 800 includes a camera 810, a sensor 820, a communication interface 830, a processor 840, and a memory 850. The camera 810 obtains the forward-view image by capturing the image in front of the vehicle. The forward-view image may be a still image or a video image. The sensor 820 includes at least one sensor configured to sense information for lane detection, such as, for example, a global positioning system (GPS) sensor configured to sense location information of the vehicle, and a light detection and ranging (LiDAR) and a radio detection and ranging (RaDAR) that are used to measure a distance from an object. However, examples of the sensor 820 are not limited to the example sensors described in the foregoing and other sensors may be used without departing from the spirit and scope of the illustrative examples described.

The processor 840 implements functions and instructions to be performed in the lane detection apparatus 800. The processor 840 processes instructions or program execution codes stored in the memory 850 or an additional storage (not shown). The processor 840 may be a data processing device embodied by hardware including a circuit of a physical structure to perform desired operations. Further details of the processor 840 are provided below.

The processor 840 may perform one or more operations, or all the operations described with reference to FIGS. 1 through 7. In an example, the processor 840 sets a plurality of ROIs in the forward-view image of the vehicle, and estimates lane pixels corresponding to a lane from each of the ROIs using a neural network-based detector. In an example, the processor 840 sets, in the forward-view image, a basic ROI, including an entire road region, and at least one additional ROI, including a local road region. The additional ROI is set when accurate lane detection is desired, and set to include, for example, a remote road region, or set based on a road situation in front of the vehicle, for example, a presence or absence of an intersection, an access road, and a merging road. The processor 840 adjusts an image resolution of the basic ROI to a low resolution, and detects a lane from the basic ROI with the low resolution and the additional ROI with a relatively high resolution. Thus, the processor 840 may determine a lane region in the forward-view image more rapidly and accurately. Based on a result of the estimating, the lane region may be determined in the forward-view image.

The memory 850 stores information to be used to perform the lane detection. The memory 850 stores instructions to be implemented by the processor 840, and information needed for the lane detection or information associated with a result of the lane detection. In addition, the memory 850 stores information associated with the detector and a recognizer that are described herein. Further details of the memory 850 are provided below.

The communication interface 830 is connected to the camera 810, the sensor 820, the processor 840, and the memory 850 to transmit and receive data. In addition, the communication interface 830 communicates with an external device through a wired or wireless network. The communication interface 830 includes, for example, an internal bus, an Ethernet card, an optical transceiver, a radio frequency transceiver, and other network interfaces configured to transmit and receive information. In an example, the communication interface 830 includes a display. In an example, the display is a physical structure that includes one or more hardware components that provide the ability to render a user interface and/or receive user input. The display can encompass any combination of display region, gesture capture region, a touch sensitive display, and/or a configurable area. In an example, the display can be embedded in the communication interface 830. In an example, the display is an external peripheral device that may be attached to and detached from the communication interface 830. The display may be a single-screen or a multi-screen display. A single physical screen can include multiple displays that are managed as separate logical displays permitting different content to be displayed on separate displays although part of the same physical screen. The display may also be implemented as an eye glass display (EGD), which includes one-eyed glass or two-eyed glasses. In an example, the display is a head-up display (HUD) or a vehicular infotainment system. In another example, processor 840 outputs the determined lanes on the display. In another example, processor 840 outputs the determined lanes through an audio signal.

The first detector 425, second detector 430, first detector 726, second detector 728, third detector 724, fourth detector 722, unified single detector 720, and other apparatuses, units, modules, devices, and components illustrated in FIGS. 4 and 7-8 that perform the operations described in this application are implemented by hardware components configured to perform the operations described in this application. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lane detection method comprising:
    setting regions of interest (ROIs) in a forward-view image of a vehicle comprising setting a basic ROI indicating an overall road region in the forward-view image and setting an additional ROI comprising a road portion in the forward-view image;
    lowering an image resolution of the basic ROI based on an image resolution of the additional ROI,
    estimating first lane pixels corresponding to a first lane from the basic ROI with the lowered image resolution and second lane pixels corresponding to a second lane from the additional ROI using a neural network-based detector; and
    determining a lane region in the forward-view image based on the first lane pixels and the second lane pixels.

2. The method of claim 1, wherein the lowering the image resolution of the basic ROI comprises:
    lowering the image resolution of the basic ROI to correspond to the image resolution of the additional ROI.

3. The method of claim 1, wherein the additional ROI comprises the road portion that is remote from an image sensor of the forward-view image.

4. The method of claim 1, wherein the setting of the ROIs comprises:
    estimating a location of a vanishing point of lanes in the forward-view image based on determined lanes of a previous forward-view image, and determining a location of the additional ROI based on the location of the vanishing point.

5. The method of claim 1, wherein the determining of the lane region comprises:
    determining third lane pixels from the basic ROI with an original image resolution based on the first lane pixels estimated from the basic ROI with the lowered image resolution; and
    determining the lane region based on locations of fourth lane pixels determined from the basic ROI with the original image resolution and locations of the second lane pixels estimated from the additional ROI.

6. The method of claim 1, wherein the setting the additional ROI comprises:
    setting the additional ROI based on a road situation in front of the vehicle.

7. The method of claim 6, wherein the setting the additional ROI comprises:
    detecting a presence or absence of at least one of an intersection, a divided road, a merging road, a tollgate entrance, or a tollgate access road in the forward-view image; and
    setting the additional ROI based on a result of the detecting.

8. The method of claim 6, wherein the setting the additional ROI comprises:
    detecting a presence or absence of at least one of an intersection, a divided road, a merging road, a tollgate entrance, or a tollgate access road in front of the vehicle based on location information of the vehicle and road information in map information; and
    setting the additional ROI based on a result of the detecting.

9. The method of claim 1, wherein the estimating of the first lane pixels and the second lane pixels comprises outputting probability information indicating a probability that each image pixel included in the each ROI corresponds to a lane.

10. The method of claim 9, wherein the determining of the lane region comprises:
    merging probability information determined for each of the ROIs; and
    determining the lane region in the forward-view image based on the merged probability information.

11. The method of claim 1, wherein the additional ROI overlaps with the basic ROI.

12. The method of claim 1, wherein the estimating of the first lane pixels and second lane pixels comprises:
estimating, in parallel, the first lane pixels from the basic ROI with lowered image resolution, and the second lane pixels from the additional ROI.

13. The method of claim 1, wherein the setting of the basic ROI comprises setting the basic ROI based on a central point of the forward-view image.

14. A non-transitory computer-readable storage medium storing instructions that, when executed by a processor, cause the processor to perform the lane detection method of claim 1.

15. A lane detection apparatus comprising:
a camera configured to capture a forward-view image in front of a vehicle; and
a processor configured to:
set a basic ROI indicating an overall road region in the forward-view image;
set an additional ROI comprising a road portion in the forward-view image;
lower an image resolution of the basic ROI based on an image resolution of the additional ROI;
estimate first lane pixels corresponding to a first lane from the basic ROI with the lowered image resolution and second lane pixels corresponding to a second lane from the additional ROI using a neural network-based detector; and
determine a lane region in the forward-view image based on the first lane pixels and the second lane pixels.

16. The apparatus of claim 15, wherein the processor is further configured to output probability information indicating a probability of each image pixel in the each ROI corresponds to a lane, and
the processor is further configured to merge the probability information determined for each of the ROIs, and to determine the lane region in the forward-view image based on the merged probability information.

17. The apparatus further of claim 15, wherein:
the image resolution of the basic ROI is reduced to an image resolution of the additional ROI; and
the neural network-based detector comprises a first neural network-based detector and a second neural network-based detector operating in parallel,
wherein the first neural network-based detector is configured to estimate the first lane pixels from the basic ROI, and the second neural network-based detector is configured to estimate the second lane pixels from the additional ROI.

18. The method of claim 1, comprising:
maintaining an original image resolution of the additional ROI, and
wherein the estimating the first lane pixels and the second lane pixels comprises:
estimating the second lane pixels from the additional ROI with the maintained original image resolution.

19. The method of claim 1, wherein the setting of the ROIs comprises:
setting a plurality of additional ROIs comprising a plurality of road portions in the forward-view image, and
wherein the lowering the image resolution of the basic ROI comprises:
lowering the image resolution of the basic ROI to correspond to a smallest image resolution among image resolutions of the plurality of additional ROIs.

20. The method of claim 19, wherein the estimating the first lane pixels and the second lane pixels comprises:
estimating lane pixels from each of the plurality of additional ROIs, and
wherein the determining the lane region comprises:
determining the lane region in the forward-view image based on the first lane pixels and the lane pixels from each of the plurality of additional ROIs.

* * * * *